May 21, 1940.  R. H. BURGESS  2,201,155
DEICING MECHANISM
Filed June 11, 1938  2 Sheets-Sheet 1
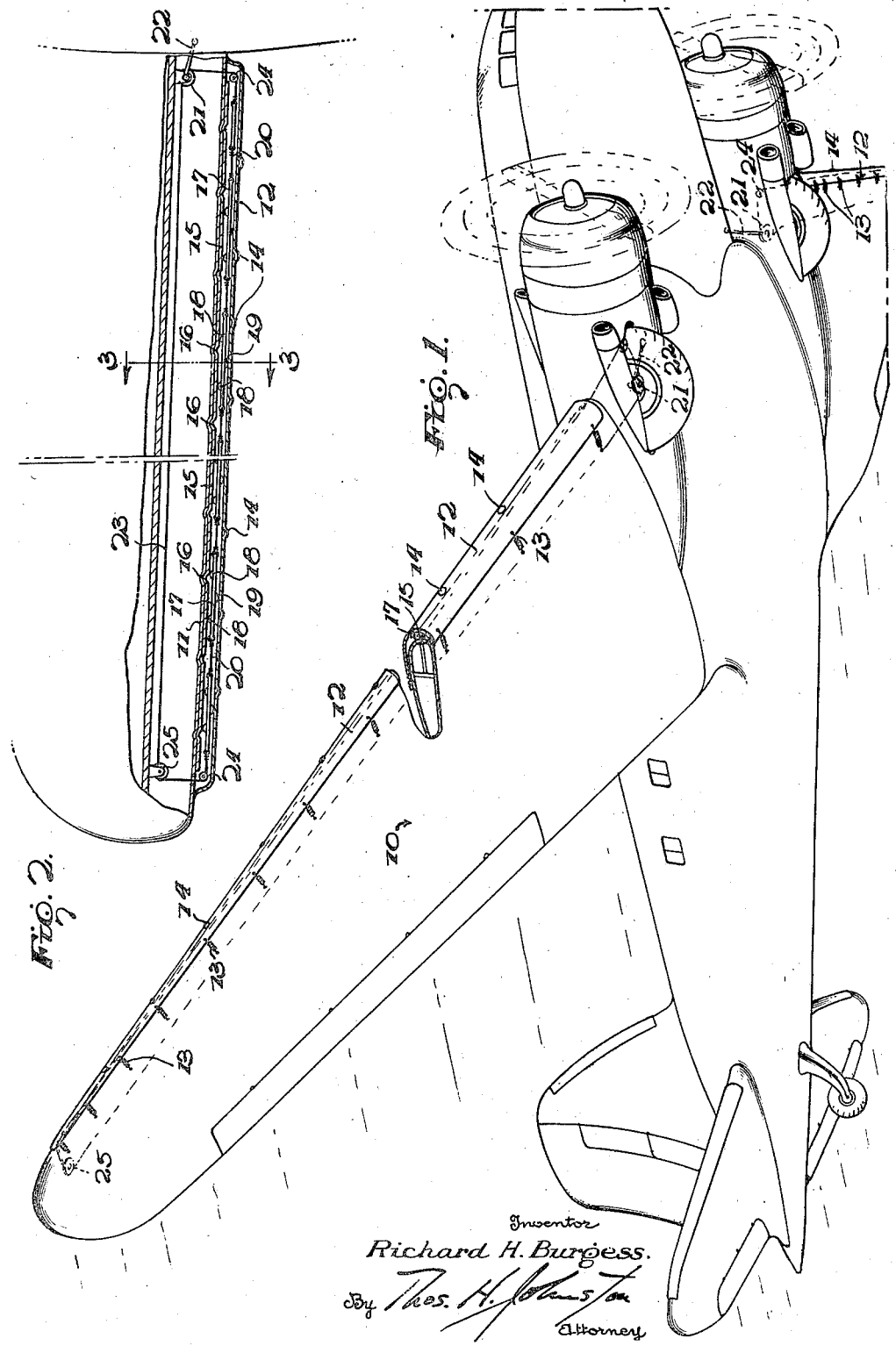
Inventor
Richard H. Burgess.
By Thos. H. Johnston
Attorney

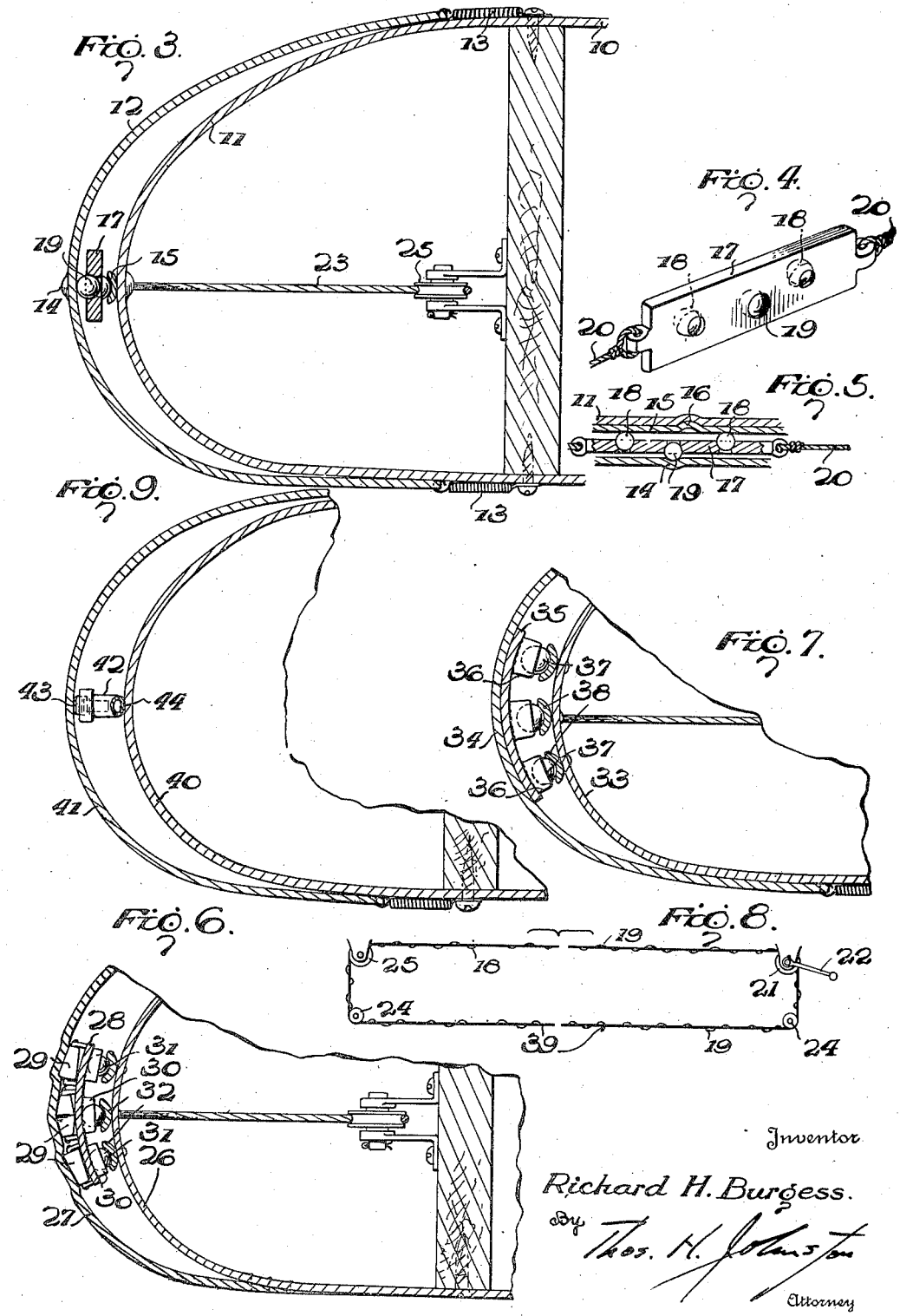

Patented May 21, 1940

2,201,155

UNITED STATES PATENT OFFICE 2,201,155

DEICING MECHANISM

Richard H. Burgess, San Antonio, Tex.

Application June 11, 1938, Serial No. 213,235

11 Claims. (Cl. 244—134)

This invention relates to an improved mechanism for removing ice from airfoils, antenna masts, loop aerials, struts, fins or the like.

As is well known, one of the great hazards of flying lies in the possibility that ice may form on the wings of a plane and an object of the present invention, therefore, is to provide a mechanism especially adapted for use upon aeroplane wings and efficiently operable for removing ice from the leading edges thereof.

A further object of the invention is to provide a mechanism which, when operated, will function to uniformly free the convex leading edge portion of a wing of ice so that no ice ridges will remain to add weight and interfere with flying control.

Still another object of the invention is to provide a mechanism embodying a flexible skin at the leading edge of the wing and wherein means will be provided for flexing said skin to form undulations therein and thus ripple the skin to break or crack any ice incrustations therefrom.

Another object of the invention is to provide a mechanism wherein, as the skin is rippled, it will also be hammered, pounded or jarred somewhat and thus vibrated more or less intensely for cracking any ice from the skin.

Still another object is to provide a mechanism wherein, as a variation, the skin will be frictionally heated as flexing is imparted thereto.

And the invention seeks, as a still further object, to provide a mechanism which will be dependable and sure and which will not be subject to any failure such as would, in flight, disrupt the contour of the leading edge of the wing.

Other and incidental objects of the invention will appear during the course of the following description, and in the drawings:

Figure 1 is a perspective view looking up at a conventional aeroplane equipped with my improved mechanism, a portion of the near wing being broken away and shown in section.

Figure 2 is a horizontal sectional view taken medially through the leading edge of the wing.

Figure 3 is an enlarged transverse vertical section on the line 3—3 of Figure 2.

Figure 4 is a detail perspective view of one of the drag units employed.

Figure 5 is a detail section showing the mounting of the balls on the drag units.

Figure 6 is a detail section of a modification embodying the use of rollers instead of balls.

Figure 7 is a detail section of a further modification embodying the use of friction links.

Figure 8 is a diagrammatic plan view of a further modification embodying the use of an endless belt to carry the drag units.

Figure 9 is a detail section of a still further modification embodying the use of fluid operated pistons for undulating and flexing the leading edge of the skin employed.

Referring now more particularly to the drawings, I have shown, in Figure 1, a conventional aeroplane equipped with my improved mechanism. As the equipment for both wings is identical, the mechanism will be described in connection with a single wing only.

As more clearly seen in Figure 3, the convex leading edge of the wing, indicated at 10, is shown at 11 and slidably embracing said edge is a concavo-convex skin 12 the diverging margins of which are elasticly or resiliently connected with the wing 10 as by suitable springs 13. As shown in Figure 1, the skin 12 preferably extends approximately the full length of the wing to conform to the graduated thickness thereof and may be of any suitable or approved material. Formed in the skin or otherwise provided at the crown of the curve thereof is a plurality of longitudinally spaced indentations 14 which provide a row of obstacles at the inner surface of the skin, and suitably fixed to the crown of the leading edge 11 of the wing opposite the row of indentations 14 is a rail 15, more or less semicircular in cross section. This rail may be of sections of approved length to accommodate flexing of the wing and extends at its ends, as shown in Figure 2, somewhat beyond the ends of the row of indentations 14. Formed in the rail, at longitudinally spaced points, is a row of indentations 16 like the indentations 14 and which form obstacles at points along the rail, the indentations 16 being staggered with respect to the indentations 14.

Mounted between the leading edge 11 of the wing and the skin 12 is a series of drag units more particularly seen in Figures 4 and 5 of the drawings. Each of these units comprises a link 17 of approved length and suitably mounted upon the link to be carried thereby is a number of revolving elements or balls comprising end balls 18 which project at one side of the link to ride against the rail 15, and a center ball 19 which projects at the opposite side of the link to ride against the crown of the skin 12 at the level of the row of indentations 14. Any chosen number of balls may, of course, be employed upon each link and flexibly connecting the links 17 are lengths of cable or the like 20.

Appropriately mounted within the wing 10, as seen in Figure 2, or at any other approved point is a pulley 21 to which is connected a hand lever 22, and attached to the ends of the series of links 17 is a cable or the like 23 which is trained about said pulley and about suitably mounted pulleys 24 near the ends of the rail 15 as well as about a suitably mounted pulley 25 aligning with the pulley 21. Thus, as will be perceived, the hand lever 22 may be rocked for reciprocating said links.

It is now to be observed that the springs 13 will act on the skin 12 to more or less tightly clamp the series of drag units between said skin and the leading edge 11 of the wing 10 so that the links 17 will be guided by the balls 18 in the plane of the rail 15 while the balls 19 of said links will be supported to roll along the inner surface of the skin 12 at the plane of the indentations 14. Accordingly, as the links are reciprocated, the balls 18 of the several links will encounter the indentations 16 in the rail while the balls 19 of said links will encounter the indentations 14 in the skin 12. Due to the resilient tension of the springs 13 on the skin, the balls will, as will be seen, be caused to ride into and out of said indentations with resultant jarring or vibration of the skin 12 at the leading edge thereof. Furthermore, as the balls ride into and out of said indentations, the effective spacing of the crown of the skin 12 away from the leading edge 11 of the wing 10 by the drag units will be varied with the result that the leading edge of the skin will be undulated or rippled while also, the normal radius of curvature of the skin will be varied and the skin thus effectively flexed both longitudinally and transversely for cracking any incrustations of ice from the leading edge of the skin.

In Figure 6 of the drawings, I have shown a modification of the invention wherein the leading edge of the wing is indicated at 26 and embracing said edge is a flexible elastic skin 27 of rubber or the like appropriately secured at its margins to the wing, the use of springs like the springs 13 being contemplated if so desired. Mounted between the leading edge 26 of the wing and the skin is a series of flexibly connected drag units each of which comprises a resilient arcuate link 28 of approved length, and suitably mounted to revolve at the forward side of said link is a series of spaced rollers 29 bearing against the leading edge of the skin 27 while at the rear side of said link are fixed sockets 30 in which are mounted balls 31. The rollers 29 may be of any approved shape, number and external design. Suitably fixed to the leading edge 26 of the wing are spaced longitudinal rails 32 like the rails 15 and provided with like indentations forming obstacles for the balls 31. Thus, as will be seen, the leading edge of the skin 27 will be rippled and jarred as well as flexed both longitudinally and transversely as the several drag units are reciprocated, suitable operating means for reciprocating said units, as shown in connection with the prior embodiment of the invention, being, of course, provided.

In Figure 7 I have shown another modification wherein the leading edge of the wing is indicated at 33 and embracing said edge is a flexible skin 34. This skin may be of any suitable material and is elasticly connected with the wing as by springs like the springs 13. Fitting the leading edge of the skin is a series of flexibly connected drag links 35 each of which provides a shoe frictionally contacting the skin. The links 35 may be of any approved length and suitably fixed at the rear side of each thereof are spaced sockets 36 in which are mounted balls 37. Appropriately secured to the leading edge 33 of the wing are spaced longitudinal rails 38 like the rails 15 and provided with indentations like the indentations 16 to form obstacles for the balls 37. Operating means for reciprocating the links 35, as shown in connection with the embodiment of the invention first described, may be provided and, as will be seen, reciprocation of said links will not only cause rippling and jarring of the skin 34 as well as transverse and longitudinal flexing thereof at its leading edge, but will also cause frictional heating of the leading edge of the skin by the links tending to melt any ice from the skin.

In Figure 8 I have shown a modification adapted to be embodied in the construction shown in Figures 1 to 5 of the drawings, in the construction shown in Figure 6 or in the construction shown in Figure 7. In the modification of Figure 8, the several drag links employed, as the case may be, are flexibly connected to form an endless belt diagrammatically indicated at 39. The belt is trained about suitably located pulleys, as shown, so that the belt may be operated, either by hand or motor power driving one of the pulleys for driving the belt as an endless unit to move the drag units successively along the inner face of the leading edge of the skin employed, as will be understood.

In Figure 9 of the drawings, I have shown still another modification wherein the leading edge of the wing is indicated at 40 and embracing said edge of the wing is a skin 41, like the skin 12 and connected with the wing as by springs like the springs 13. Mounted at suitable points between the leading edge 40 and the skin is a series of longitudinally spaced cylinders 42 in which are mounted pistons 43 to engage the skin 41 at the crown of the leading edge thereof. Connecting the cylinders is a system of pipes or tubing 44 adapted to contain air or other suitable fluid for actuating the pistons in such manner that the pistons will be forced forwardly to jar and ripple the skin 41 as well as flex said skin both longitudinally and transversely for breaking any ice from the leading edge of the skin.

I claim:

1. A deicing mechanism for an air foil including a flexible skin overlying a portion of said air foil and provided with a leading edge, a movable drag link operatively coacting with said edge at its inner side, means mounting the link for movement longitudinally of said edge, and obstacles in the path of movement of said link for vibrating the link as it is moved and flexing the leading edge of the skin to crack ice therefrom.

2. A deicing mechanism for an air foil including a pliable skin overlying a portion of said air foil and provided with a leading edge, a movable drag link, means mounting the link for movement longitudinally of said edge, and means on said link to coact with the leading edge of said skin for flexing said edge to crack ice therefrom as the link is moved.

3. A deicing mechanism for an air foil including a flexible skin overlying a portion of said air foil and provided with a leading edge, a movable drag link frictionally coacting with said edge at its inner side and shiftable for flexing said edge to crack ice therefrom, and means mounting the link for movement longitudinally of said edge.

4. A deicing mechanism for an air foil including a flexible skin overlying a portion of said air foil and provided with a leading edge, and means mounted to coact with said edge at its inner side and operable by fluid pressure for flexing said edge to break ice therefrom, said means rigidly spacing said edge from the airfoil.

5. A deicing mechanism for an airfoil having a leading edge, said mechanism including a flexible skin having a leading edge overlying the former edge in spaced relation thereto, means mounted outside of the airfoil within the skin in the space between said edges and movable longitudinally of the leading edge of the skin to flex the same and crack ice therefrom, and means disposed in said space and operatively mounting the former means.

6. A deicing mechanism for an airfoil including a flexible skin overlying a portion of said airfoil and provided with a leading edge, means rigidly spacing said edge from the airfoil and movable longitudinally of said edge to flex the same and crack ice therefrom, and means in said space operatively mounting the former means.

7. A deicing mechanism for an airfoil including a flexible skin overlying a portion of said airfoil and provided with a leading edge, means rigidly spacing said edge from the airfoil and providing an obstruction within the skin tending to form a transverse ripple in said edge at said means, and means for shifting the former means within the skin to cause said ripple to progress longitudinally along said edge and undulate the same to crack ice therefrom.

8. A deicing mechanism for an airfoil including a flexible skin overlying a portion of said airfoil and resiliently anchored thereto, means rigidly spacing said edge from the airfoil and providing an obstruction acting against the tension of said anchorage to form a bulge in said edge at said means, and means for shifting the former means within the skin and flexing said edge to crack ice therefrom.

9. A deicing mechanism for an airfoil including a flexible skin overlying a portion of said airfoil and provided with a leading edge, means rigidly spacing said edge from the airfoil and provided with angularly disposed surfaces contacting said edge transversely to form an obstruction within the skin pressing against the skin to define a local transverse band of angularly flexed portions of said edge at said surfaces, and means for shifting the former means within the skin and flexing said edge to crack ice therefrom.

10. A deicing mechanism for an airfoil including a flexible skin overlying a portion of said airfoil and provided with a leading edge, a drag link having means thereon to coact with said edge for flexing the same as the link is shifted, a rail mounted upon the airfoil and provided with obstacles, means carried by the link to follow said rail and encounter said obstacles for vibrating the link upon movement thereof longitudinally of the rail, and means for shifting the link longitudinally of the rail.

11. A deicing mechanism for an airfoil including a flexible skin overlying a portion of said airfoil and provided with a leading edge, a drag link, rollers mounted upon the link to coact with said edge for flexing the same as the link is shifted, a rail mounted upon the airfoil and provided with obstacles, means carried by the link to follow said rail and encounter said obstacles for vibrating the link upon movement thereof longitudinally of the rail, and means for shifting the link longitudinally of the rail.

RICHARD H. BURGESS.